US007975215B2

(12) United States Patent
Duncan et al.

(10) Patent No.: US 7,975,215 B2
(45) Date of Patent: Jul. 5, 2011

(54) SHARING EDITABLE INK ANNOTATED IMAGES WITH ANNOTATION-UNAWARE APPLICATIONS (75) Inventors: Richard J. Duncan, Kirkland, WA (US); David B. Perry, Lynnwood, WA (US); Weerapan Wilairat, Sammamish, WA (US); Gavin M. Gear, Bothell, WA (US); Richard L. Spencer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 798 days.

(21) Appl. No.: 11/748,265

(22) Filed: May 14, 2007

(65) Prior Publication Data
US 2008/0288857 A1  Nov. 20, 2008

(51) Int. Cl.
*G06F 17/00* (2006.01)
(52) U.S. Cl. ......................... 715/230; 715/232
(58) Field of Classification Search .................. 715/230, 715/200, 232–233
See application file for complete search history.

(56) References Cited

U.S. PATENT DOCUMENTS

| 6,041,335 | A  | * | 3/2000  | Merritt et al. ................. 715/203 |
| 6,859,909 | B1 |   | 2/2005  | Lerner et al. .................. 715/203 |
| 7,068,309 | B2 |   | 6/2006  | Toyama et al. ............. 348/231.5 |
| 7,356,563 | B1 | * | 4/2008  | Leichtling et al. ............ 709/204 |
| 7,373,590 | B2 | * | 5/2008  | Woolf et al. .................. 715/230 |
| 7,424,670 | B2 | * | 9/2008  | Burke et al. .................. 715/230 |
| 7,502,809 | B2 | * | 3/2009  | Albornoz et al. ............. 707/102 |
| 7,620,648 | B2 | * | 11/2009 | Cragun et al. ................ 707/102 |
| 7,647,373 | B2 | * | 1/2010  | Johnson et al. ............... 709/204 |
| 2004/0260714 | A1 | * | 12/2004 | Chatterjee et al. ............ 707/101 |
| 2005/0091578 | A1 |   | 4/2005  | Madan et al. .................. 715/201 |
| 2006/0212794 | A1 |   | 9/2006  | Evans et al. ................... 715/203 |
| 2007/0053004 | A1 |   | 3/2007  | Calaway ....................... 358/3.28 |

FOREIGN PATENT DOCUMENTS

WO  WO 2006/029259 A2  3/2006

OTHER PUBLICATIONS

Kahan, J. et al., "Annotea: An Open RDF Infrastructure for Shared Web Annotations," *WWW10*, http://web5.w3.org/2001/Annotea/Papers/www10/annotea-www10.ps, 10 pages (May 1-5, 2001).
Kustanowitz, J., "Web-Wide Media Annotation," https://www.cs.umd.edu/~jkustan/papers/WebPhotos.doc, 5 pages (Publicly known at least as early as May 14, 2007).

(Continued)

*Primary Examiner* — Stephen S. Hong
*Assistant Examiner* — Manglesh M Patel
(74) *Attorney, Agent, or Firm* — Merchant & Gould (57) ABSTRACT

Data associated with pixels obscured by annotations in an annotated image is stored using an annotation mask enabling annotation-aware applications to reconstruct the original image, while annotation-unaware applications can display the annotated image with optimized increase in extra data to be stored. The annotation mask, same size as the image, is initialized to a monochrome default and the color depth information for obscured pixels saved within the annotation mask. Because a majority area of the annotation mask is monochrome, it compresses well and the obscured image content can be saved in a side channel, metadata header, or a separate file. During reconstruction, changes to annotated image such as rotation, size change, and the like, may be detected and accounted for when obscured image content is carried over to the annotated image for reconstruction.

18 Claims, 8 Drawing Sheets

OTHER PUBLICATIONS

Lux, M. et al., "Semantic Annotation and Retrieval of Digital Photos," *The 15th Conference on Advanced Information Systems Engineering*, http://ftp.informatik.rwth-aachen.de/Publications/CEUR-WS/Vol-74/files/FORUM_22.pdf, pp. 85-88 (Jun. 16-20, 2003).

Mehta, N. et al., "Collaborative Photo Annotation in Mobile Devices," http://www.ischool.berkeley.edu/~gwyu/cs376_PhotoBuddy/CollaborativePhotoAnnotation31.doc, 4 pages (Dec. 9, 2004).

* cited by examiner

SHARING EDITABLE INK ANNOTATED IMAGES WITH ANNOTATION-UNAWARE APPLICATIONS

BACKGROUND

Images are created, edited, viewed, and used in other ways by countless number of devices and applications. Increasingly, annotating images through ink applications (i.e. taking notes, editing, modifying existing text on images, and so on) and devices such as tablet PCs, handheld computers, and so on, is becoming popular and common. However, there are still a very large number of applications in use that are annotation-unaware (i.e. they cannot decode annotation information on an annotated image).

To store annotations in an image file two methods are commonly used. The first is to flatten the annotations directly onto the image. Flattening is a term used for integrating annotations or other types of additional information such as additional layers of image into a single layer where all additional information becomes an integral of the original image possibly obscuring portions of it. The second is to embed the ink data in a secondary location within the image file (such as the metadata headers, a side channel, etc.) and have only specific annotation-aware applications be able to display the annotations.

There are significant drawbacks to both approaches. Flattened images can be shared very easily—the annotations will always be displayed along with the picture since they are part of the picture. However, the information for the obscured portion of the image may be forever lost and cannot be easily (or not at all) reconstructed. On the other hand, embedded ink allows preservation of the original image data in that it is non-destructive to the image content and can easily be edited/removed at a later date. However, since embedded ink is not part of the image content, it can only be displayed by a limited set of annotation-aware applications.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to preserving image information for portions of an image obscured by editable ink annotations such that the original image can be reconstructed by an editable-annotation-aware application while the annotated image can be processed by both annotation-aware and annotation-unaware applications. Based on the preserved information changes to the image may also be detected and users warned.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, data for portions of an image obscured by editable ink annotations on the image is preserved in an optimized manner such that the original image can be constructed while the annotated image can be processed by annotation-unaware applications. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1A:
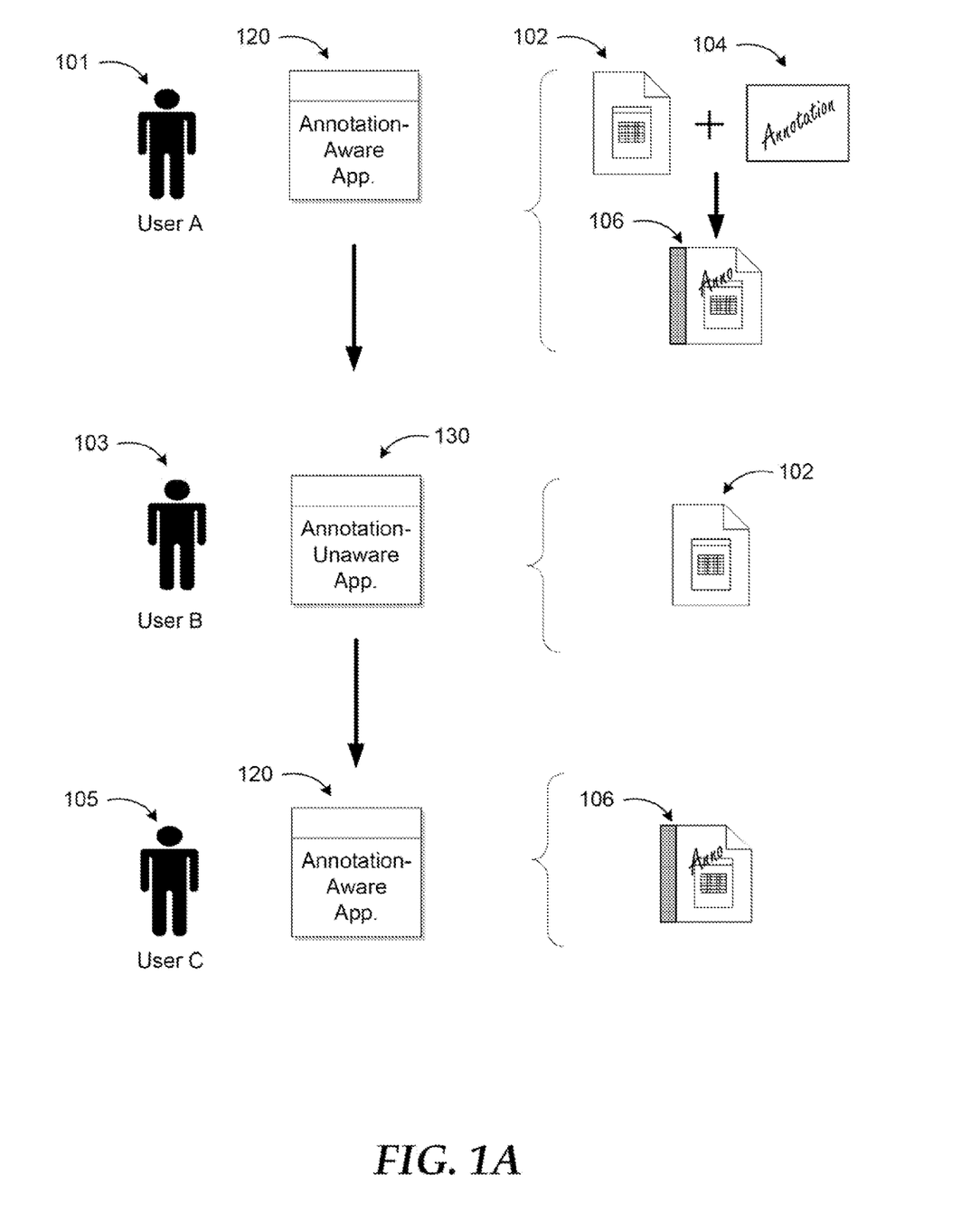
FIG. 1A illustrates an example problem with sharing annotated images between users of annotation-aware and annotation-unaware applications.

FIG. 1A illustrates an example problem with sharing annotated images between users of annotation-aware and annotation-unaware applications. As described above, editable annotation data may be stored in ways that it is not visible to an annotation-unaware application. A digital image with such invisible annotation data may easily be re-shared without the original user's knowledge. For example, user A (101) annotates a photo 102 using annotation-aware application 120 and sends the annotated image file 106 to user B (103). User B (103) receives the annotated image file 106, but only has annotation-unaware application 130, so she can see the original image 102 and not the annotations.

User B (103) then sends the image along to user C (105), who has annotation-aware application 120. User C (105) can see the annotations in annotated image file 106, which may contain something that user A (101) would want only user B (103) to see and not user C (105).

Figure 1B:
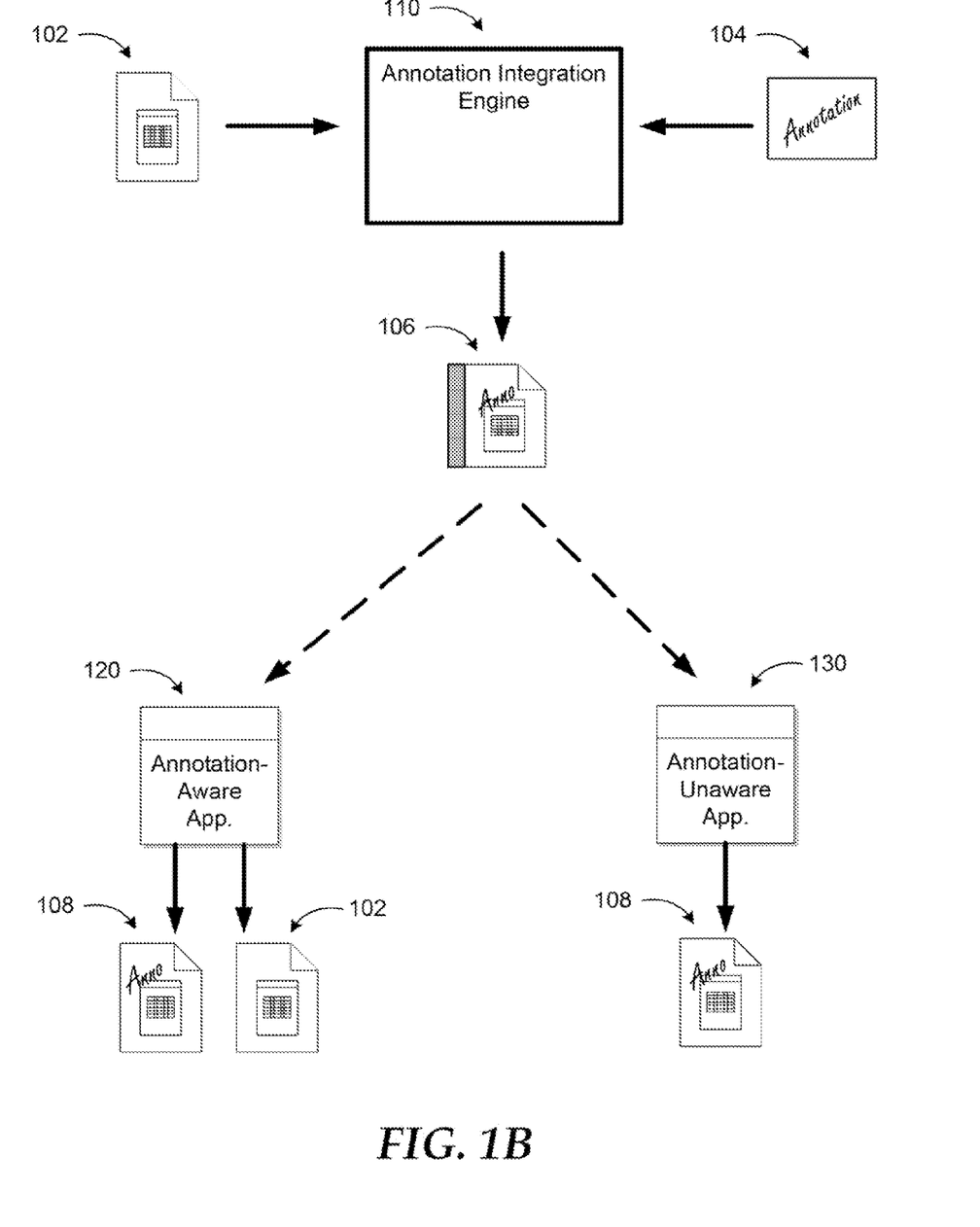
FIG. 1B illustrates an example annotation sharing system with annotation-aware and annotation-unaware applications.

Referring to FIG. 1B, an example annotation sharing system with annotation-aware and annotation-unaware applications is illustrated. As discussed previously, flattened images with annotation cannot be easily reconstructed to their original form and embedded editable ink annotations may only be processed by annotation-aware applications.

Embodiments provide approaches for storing annotations on a single layer digital image (i.e. an image file that comprises two dimensional information for the image only and not multiple layers such as different attributes for the image) such that it is visible on all image viewer applications, yet the annotations remain editable and/or removable at a later date. According to one embodiment, the ink is flattened onto the image, yet also storing supplemental information necessary to reconstruct the photo such as information for the portions of the image that are obscured by the ink annotation strokes. This supplemental data may be stored in an optimized way reducing resource consumption. To reconstruct the image, the supplemental data is simply rendered on top of the annotated image bits.

While the term "image" is used in conjunction with annotations throughout this document, embodiments may be implemented to integrate annotations onto and reconstruct other types of documents too. For example, text documents, spreadsheets, and other types of documents may be annotated and the annotation information saved as described below using the same principles.

Annotation integration engine 110 may be a separate module or an integral part of an annotation-aware image processing application. The annotation(s) 104 may be received as editable ink from an ink processing module and integrated with the non-annotated image 102 by creating a monochrome annotation mask, rendering the annotations on the mask, creating an off-screen Obscured Image Content (OIC) bitmap, and persisting the annotations on the image file itself such that the image is a single layer (flat) image. The OIC may be saved in a side channel, in the metadata header, or in an associated separate file or database.

Color digital images are made of pixels, and pixels are made of combinations of primary colors. A channel in this context is the grayscale image of the same size as a color image, made of one of these primary colors. For example, an image from a digital camera may have a red, green and blue channel. A grayscale image has just one channel. In the digital realm, there can be any number of conventional primary colors making up an image; a channel in this case is extended to be the grayscale image based on any such conventional primary color. By extension, a channel is any grayscale image the same size with the "proper" image, and associated with it. The annotated image 106 with the OIC information is then made available to other applications.

According to some embodiments, the annotated image 106 with the OIC information may be provided to an annotation-aware application 120, which may present/process the annotated image as is or reconstruct the original image by reading the OIC information and carrying it over to the annotated image such that obscured portions of the original image are filled in with the original image data.

The annotated image 106 with the OIC information may also be provided to an annotation-unaware application 130, which may display or process the annotated (flat) image with its annotations.

A minimal amount of information necessary to reconstruct the image is stored according to embodiments. Large sections of solid black or another single color in the annotation mask and OIC data can be compressed to a very small size. The portions of the images that do contain information may grow in size proportionally as more annotations are added. In a worst case scenario (every pixel is covered by annotations), the image may slightly more than double in size.

When implemented as an Application Programming Interface (API), the annotations may be rendered onto the image either by the processing application or by the API code. If rendered by the application, which may allow for more advanced rendering techniques, then the API may simply require enough information to produce the annotation mask. In the case of effects like a drop-shadow on ink, all that is needed may be an integer with how much the mask ink needs to be expanded to cover the rendered ink.

While storing in the common graphic file formats (such as JPG) has many obvious examples for interoperability, there is also a drawback. Many applications exist that can view these images, and many also allow for the images to be edited. If the image is edited in an application that is not aware of the extra information needed to restore the non-annotated image, then the original image may be unrecoverable. This is because some file formats are not designed to store extra information (e.g. bmp files).

According to some embodiments, the risk of losing original image information due to changes by an annotation-unaware application may be mitigated by storing a Cyclic Redundancy Check (CRC), which uniquely identifies the exact binary data in the image file, with the restore data or by storing other properties of the photo with the restore data, such as width and height. Alternatively, a CRC of just the obscured content may be stored within the restore data.

According to other embodiments, whether the image has been changed may be detected through the CRC and other properties and the user warned. If the nature of the change to the image can be determined, the original image may still be reconstructed. For example, a rotation at defined amounts, a horizontal or vertical flip, or a resize (where the aspect ratio is preserved) may be recovered since the OIC can be subjected to the same operation before being looped over to the annotated image.

For other edits (cropping, free-rotation, etc), which may not be as easy to automatically recover, an image analysis may be performed to find the annotations (such as the ink strokes), and then the restore data stretched so that it matches over the newly positioned ink. If image analysis fails to find where the annotations are with high confidence, a User Interface (UI) may be provided that allows the user to drag around the annotations so they match up correctly.

If the user edits the pixels of the image in an area that is not affected by annotations, the CRC of just the obscured content may be used to still allow the restoration data to apply. Some edits (color palette edits, drawing on the photo, etc) may not be recoverable at all. In that case, an error message may be displayed to the user.

A system according to embodiments is not limited to the example system and its components described above. Flattening ink annotations onto an image such that the image can be reconstructed later with minimal supplemental information may be implemented with fewer or additional components performing additional or fewer tasks using the principles described herein. For example, the annotation integration process may be performed by a separate module, by an API, or by an annotation-aware application itself. Similarly, the reconstruction of the original image may be performed by a reconstruction module or the annotation-aware application.

Figure 2:
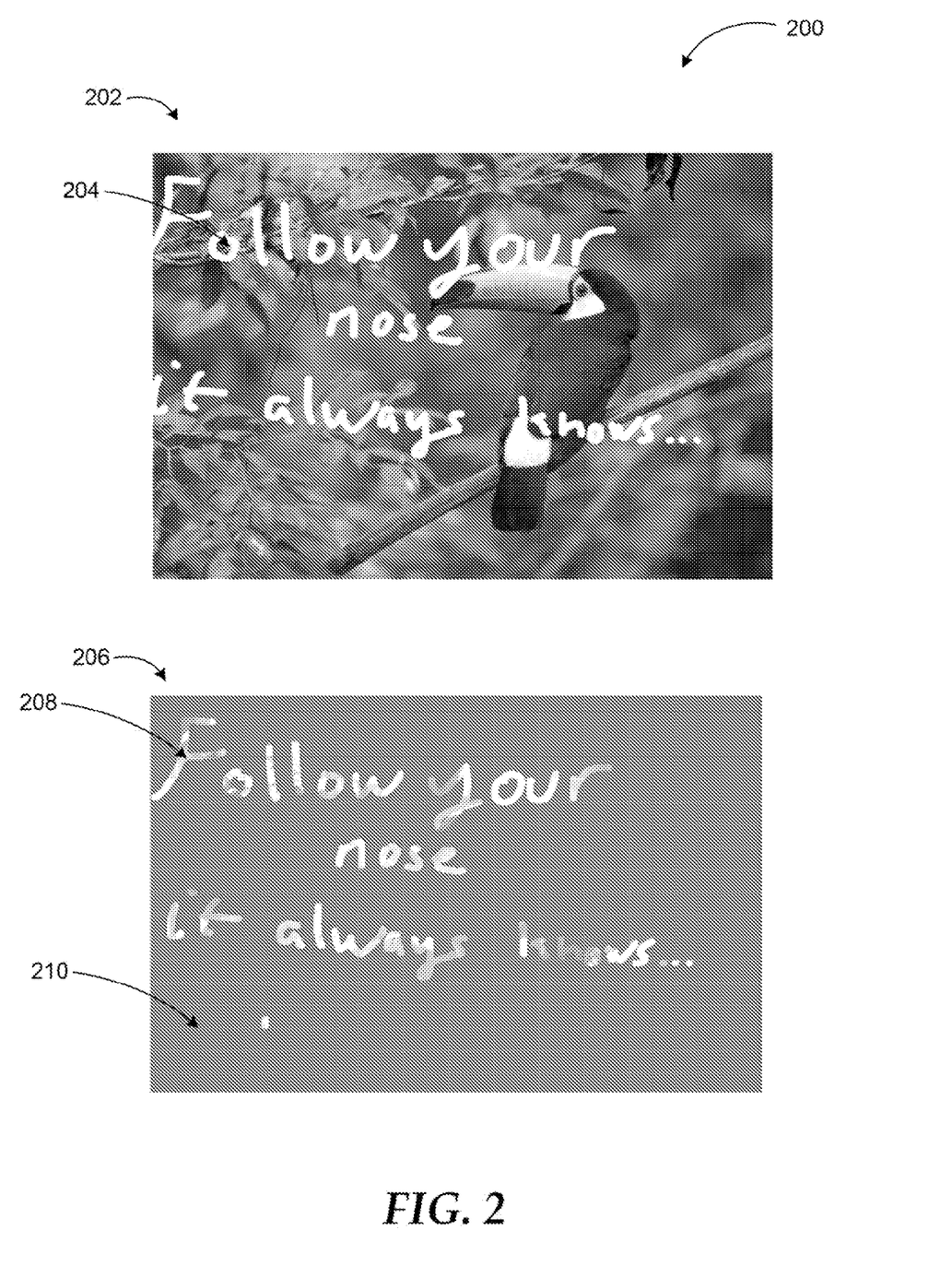
FIG. 2 illustrates an annotated image and its corresponding annotation mask with the Obstructed Image Content (OIC)

FIG. 2 illustrates an annotated image and its corresponding annotation mask with the Obstructed Image Content (OIC). While editable ink annotations are represented monochrome, embodiments may also be implemented with multi-colored ink. Since the annotations are flattened onto the image, their color information may be preserved as provided by the user. It should be noted that the color of the ink does not affect the OIC information stored for subsequent reconstruction of the original image.

Image 202 in FIG. 2 includes editable ink annotations 204. According to one embodiment, a monochrome bitmap with the same size as the image is generates as annotation mask 206 initializing all pixels to a default color. Because single color can be compressed to a very small amount of data in most color formats, the majority area of the annotation mask without the OIC information (210) can be saved with minimal information.

Following rendering of the annotations on the annotation mask, OIC information (208) is carried over from the original image to the annotation mask with its color depth. The OIC data is saved in the same format the as the original image and can be persisted in the image metadata headers, a side channel, and so on.

Figure 3:
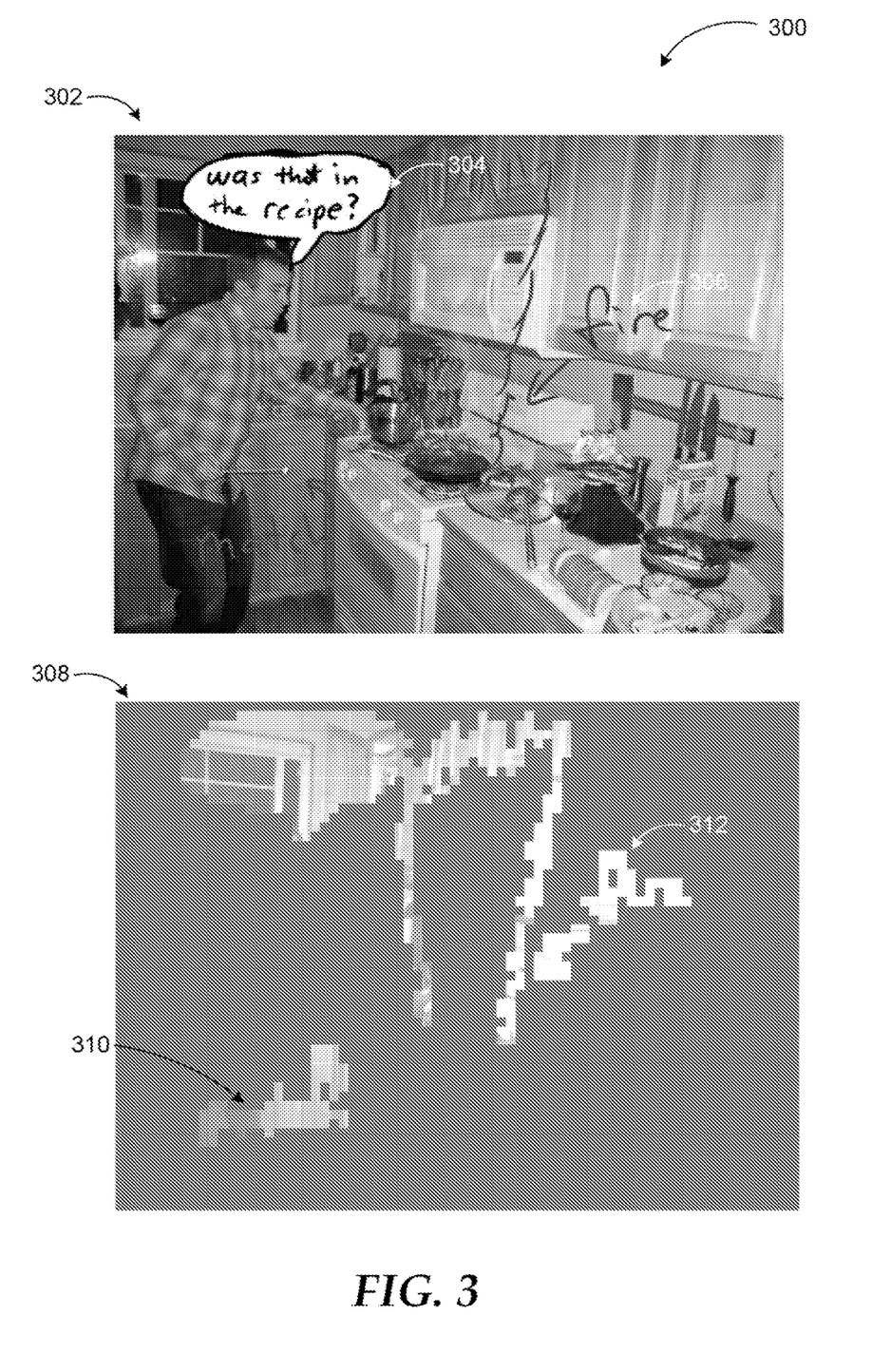
FIG. 3 illustrates another annotated image and its corresponding annotation mask with the OIC where the pixels are at a larger granularity.

FIG. 3 illustrates another annotated image and its corresponding annotation mask with the OIC where the pixels are at a larger granularity. Image 302 includes different annotation types such as a speech bubble 304 and handwriting 306.

The annotation mask 308 for image 302 is also initialized with a default color. The annotations (e.g. 310, 312) are, however, rendered on annotation mask 308 in larger granularity compared to the annotation mask 206 of FIG. 2. Depending on an image file format, a desired quality of image, a desired file size, and the like, the granularity may be predefined or selected by the user.

For example, the JPEG file format uses a compression scheme which first divides the image into 8×8 pixel blocks. Each block is completely independent of other blocks. So, the annotation mask may be expanded out to 8×8 blocks (if any pixel in a block is hit, every pixel in that block is marked). This ensures that the original image is accurately reproduced with no compression artifacts or bleeding. This approach provides for the OIC data for an image with a fairly large portion annotated (e.g. annotation mask 306) to be still relatively small.

For other image file formats, how the compression mechanism is influenced by the annotations and OIC may be carefully considered. For example, using a GIF format, the OIC may be generated such that color quantization is not affected or the fidelity of the original image may be reduced.

While specific file formats and annotation saving techniques are used and described, a system according to embodiments is not limited to the definitions and examples described above. Annotation information storage through annotation mask may be provided using other file formats and techniques. Furthermore, the principles described herein are not limited to editable ink, but may also be applied to any type of annotation or overlay displayed over an image.

Figure 4:
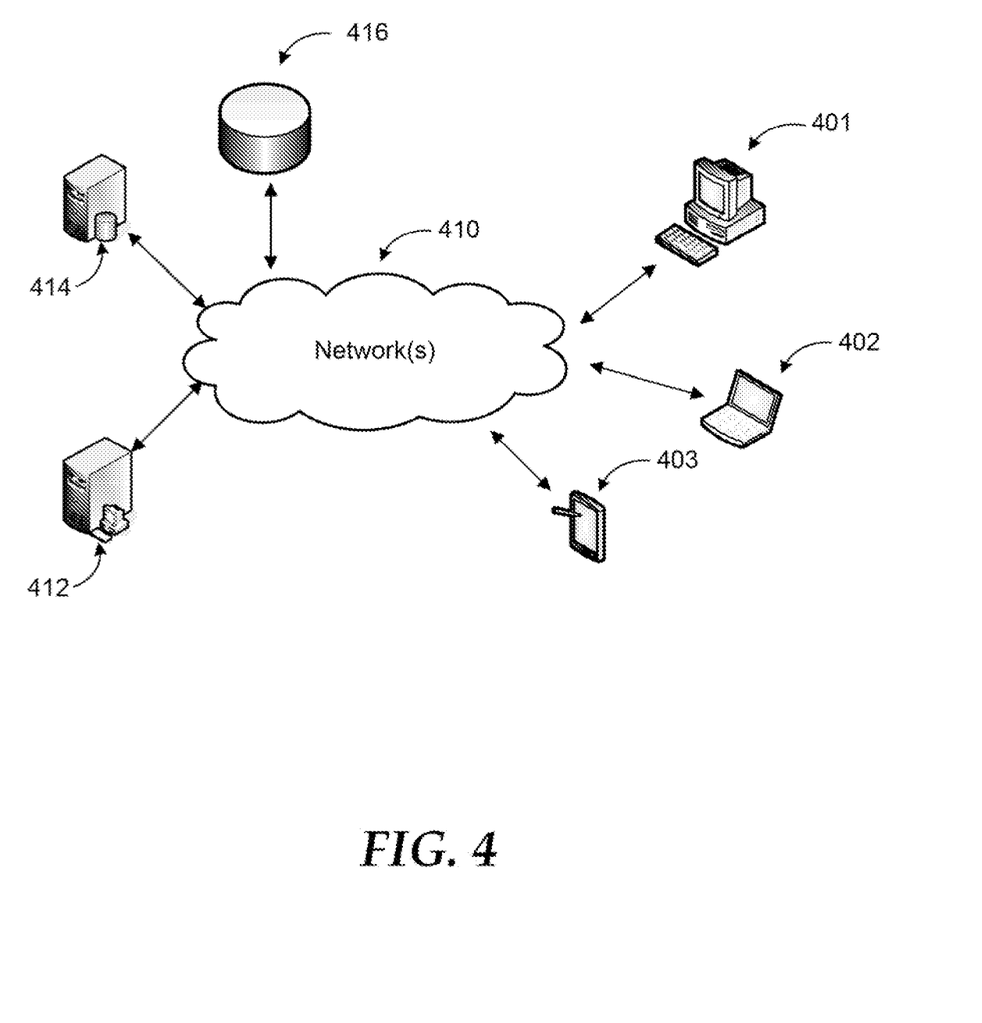
FIG. 4 is an example networked environment, where embodiments may be implemented.

FIG. 4 is an example networked environment, where embodiments may be implemented. Flattening annotations onto an image while saving OIC information using an annotation mask may be implemented locally on a single computing device or in a distributed manner over a number of physical and virtual clients and servers. They may also be implemented in un-clustered systems or clustered systems employing a number of nodes communicating over one or more networks (e.g. network(s) 410).

Such a system may comprise any topology of servers, clients, Internet service providers, and communication media. Also, the system may have a static or dynamic topology, where the roles of servers and clients within the system's hierarchy and their interrelations may be defined statically by an administrator or dynamically based on availability of devices, load balancing, and the like. The term "client" may refer to a client application or a client device. While a networked system implementing editable annotated image sharing may involve many more components, relevant ones are discussed in conjunction with this figure.

An annotation integration engine according to embodiments may be implemented as part of an annotation-aware image processing application in individual client devices 401-403 or executed in server 412 and accessed from anyone of the client devices (or applications). Data stores associated with providing annotation saving such as a store for saving OIC associated with annotated images may be embodied in a single data store such as data store 416 or distributed over a number of data stores associated with individual client devices, servers, and the like. Dedicated database servers (e.g. database server 414) may be used to coordinate data retrieval and storage in one or more of such data stores.

As described previously, a more common approach may be saving the OIC as part of the image file. When the image file with the OIC information is distributed to other applications, an annotation-aware application on any one of the clients or the servers may reconstruct the original image as discussed above.

Network(s) 410 may include a secure network such as an enterprise network, an unsecure network such as a wireless open network, or the Internet. Network(s) 410 provide communication between the nodes described herein. By way of example, and not limitation, network(s) 410 may include wired media such as a wired network or direct-wired connection, and wireless media such as acoustic, RF, infrared and other wireless media.

Many other configurations of computing devices, applications, data sources, data distribution systems may be employed to implement providing flattening annotations on images while saving OIC information. Furthermore, the networked environments discussed in FIG. 4 are for illustration purposes only. Embodiments are not limited to the example applications, modules, or processes.

Figure 5:
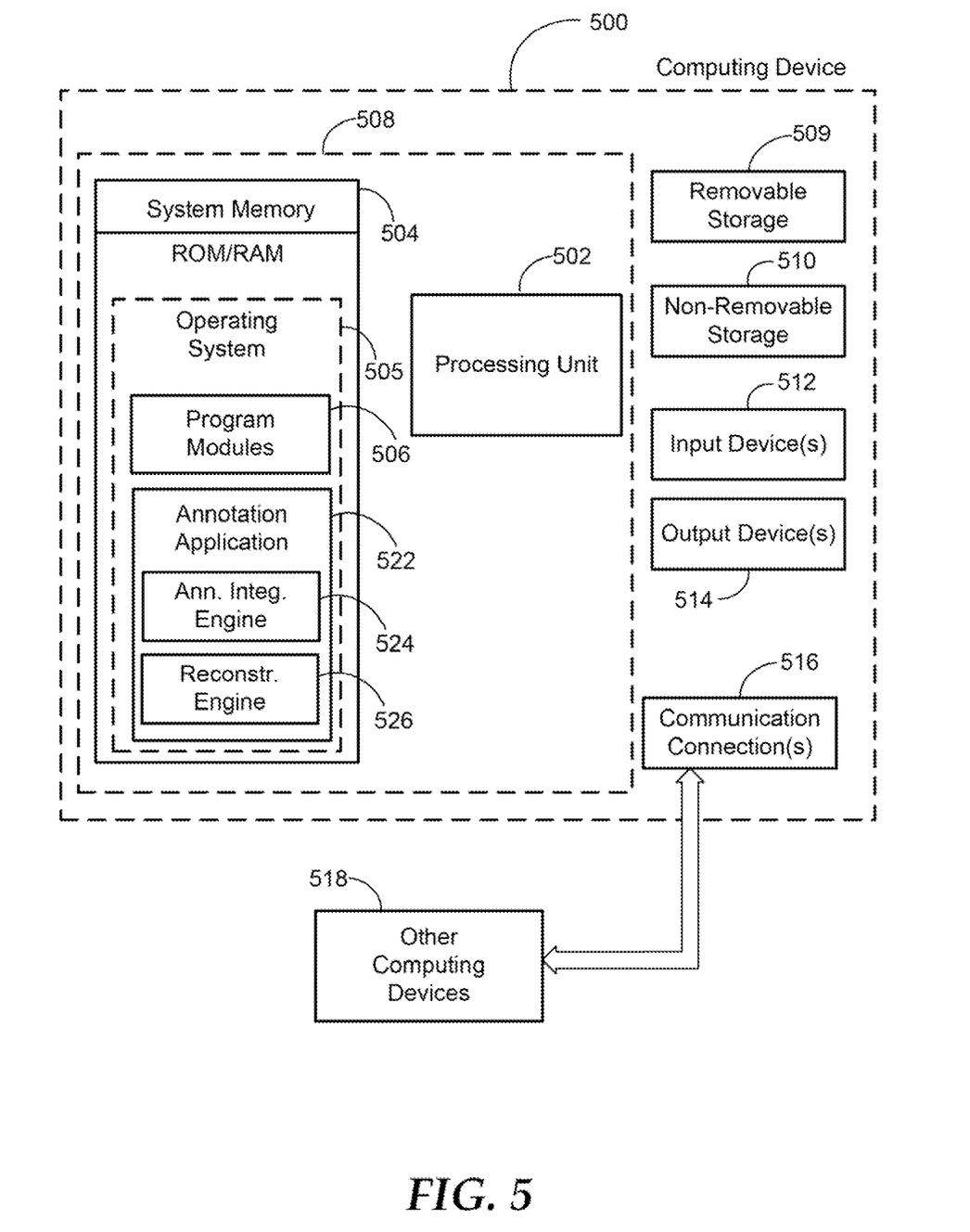
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment is illustrated, such as computing device 500. In a basic configuration, the computing device 500 may be a client device or server providing annotation-aware image processing and typically include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of a networked personal computer, such as the WINDOWS® operating systems from MICROSOFT CORPORATION of Redmond, Wash. The system memory 504 may also include one or more software applications such as program modules 506, annotation application 522, annotation integration engine 524, and reconstruction engine 524.

Annotation application 522 may be a separate application or an integral module of a desktop service that provides other services to applications associated with computing device 500. Annotation integration engine 524 and reconstruction engine 526 may provide services associated with generating/storing OIC information and reconstructing the original image, respectively. This basic configuration is illustrated in FIG. 5 by those components within dashed line 508.

The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of device 500. Computing device 500 may also have input device(s) 512 such as keyboard, mouse, pen, voice input device, touch input device, etc. Output device(s) 514 such as a display, speakers, printer, etc. may also be included. These devices are well known in the art and need not be discussed at length here.

The computing device 500 may also contain communication connections 516 that allow the device to communicate with other computing devices 518, such as over a wireless network in a distributed computing environment, for example, an intranet or the Internet. Other computing devices 518 may include server(s) that provide updates associated with the anti spyware service. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods of operation. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
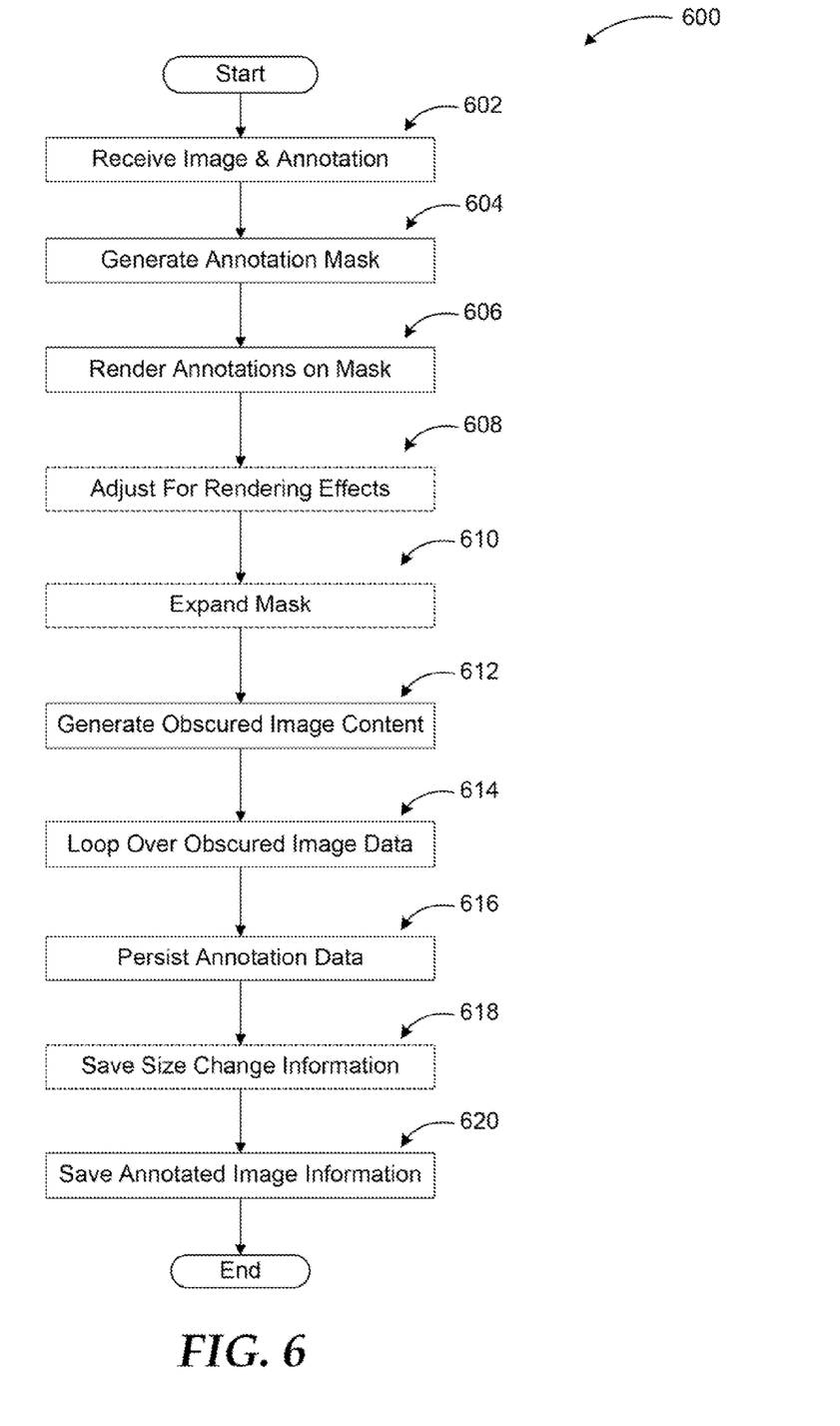
FIG. 6 illustrates a logic flow diagram of an annotation information saving process according to embodiments.

FIG. 6 illustrates a logic flow diagram of an annotation information saving process according to embodiments. Process 600 may be implemented as part of an annotation integration engine in an annotation-aware image processing application.

Process 600 begins with operation 602, where an image and annotation to be integrated into the image are received. The annotation may be generated through an ink processing system that receives user ink input, performs recognition (e.g. handwriting recognition, shape recognition, etc.) and other processes and provides the ink annotation to the annotation integration engine. Processing advances from operation 602 to operation 604.

At operation 604, a monochrome off-screen bitmap at the same size as the image is generated as the annotation mask. All pixels of the annotation mask are initialized to a default color (e.g. black). Processing continues to operation 606 from operation 604.

At operation 606, annotations are rendered onto the annotation mask. Processing continues to optional operation 608 from operation 606.

At optional operation 608, the annotation mask is adjusted to account for rendering effects such as anti-aliasing by increasing a size of the annotations. Processing continues to optional operation 610 from optional operation 608.

At optional operation 610, the mask is expanded as needed to reduce compression artifacts. Processing continues to operation 612 from operation 610.

At operation 612, an off-screen bitmap the same size and color depth as the annotated image is created, again initializing all pixels to the default color. This bitmap is referred to as the Obscured Image Content (OIC). Processing continues to operation 614 from operation 612.

At operation 614, each obscured pixel the original image is carried over (loop-over), copying them from the annotated image to the OIC bitmap if a pixel corresponds to an annotation pixel on the annotation mask bitmap. Processing continues to operation 616 from operation 614.

At operation 616, the annotation data (ink serialized format, etc) and the annotation mask are persisted. The annotation mask can be persisted as an image file that compresses well with minimal colors (such as a GIF), and the OIC data in the same format the original image. Processing continues to optional operation 618 from operation 616.

At optional operation 618, size change information is saved. If the annotations cause the image to change in size (such as an ink stroke outside the bounds of the original image), a rectangle indicating the bounds of the original image may be stored within the new annotated image. Processing advances from optional operation 618 to operation 620.

At operation 620, the annotation mask containing the OIC information is saved in the image metadata header, in a side channel, a separate file, and the like. After operation 620, processing moves to a calling process for further actions.

Figure 7:
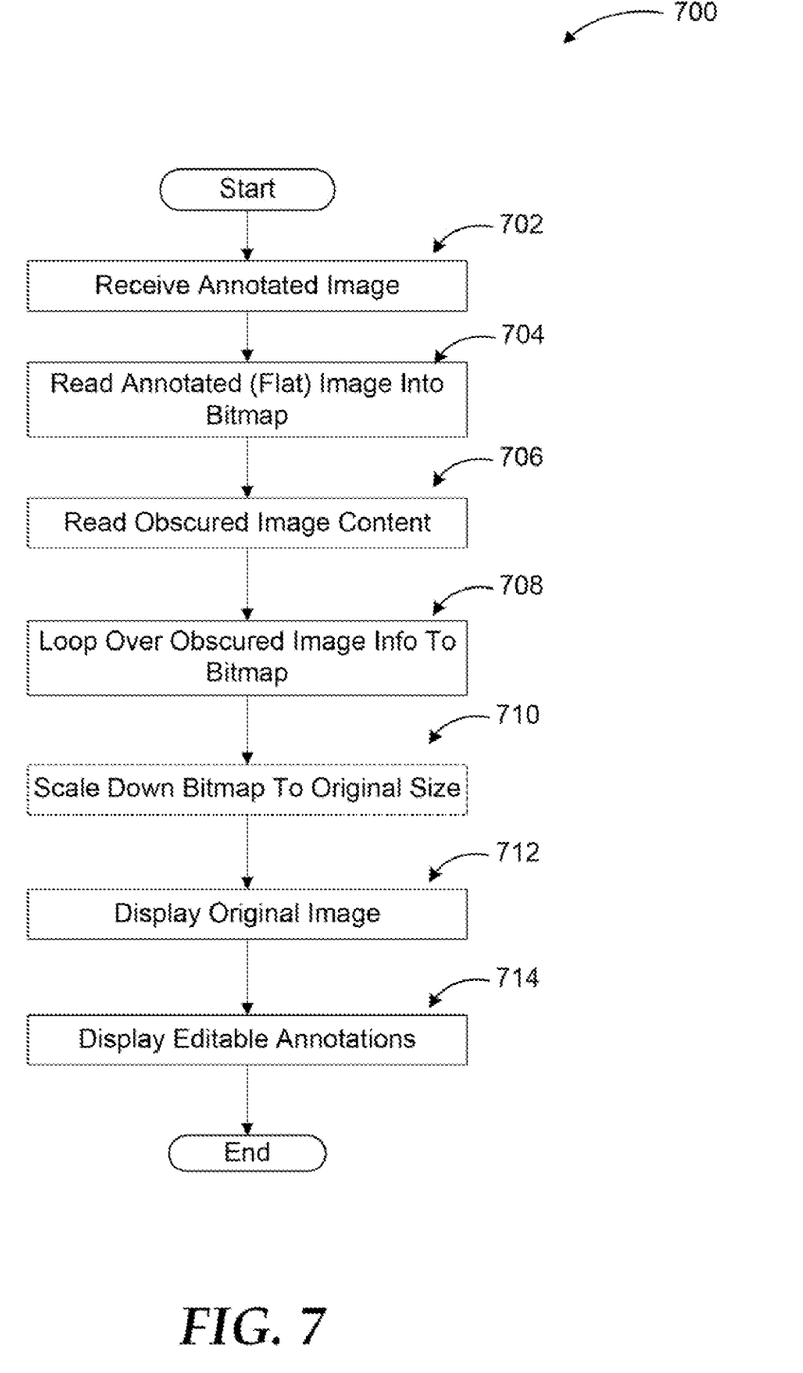
FIG. 7 illustrates a logic flow diagram of a reconstruction process of an annotated image according to embodiments.

FIG. 7 illustrates a logic flow diagram of a reconstruction process of an annotated image according to embodiments. Process 700 may be implemented as part of a reconstruction engine in an annotation-aware image processing application.

Process 700 begins with operation 702, where the annotated (flattened) image is received by the reconstructions engine. The annotated image, as described above, includes OIC information in a side channel, a metadata header, or a separate file. Processing advances from operation 702 to operation 704.

At operation 704, the flattened image is read into a bitmap, which becomes at the end of the process the reconstructed image. Processing continues to operation 706 from operation 704.

At operation 706, the OIC information and the annotation mask are read to determine location of obscured pixels and image data contained in those obscured pixels. Processing continues to operation 708 from operation 706.

At operation 708, each pixel in the image is looped over, copying obscured pixel data from the OIC to the annotated image if the pixel is indicated as an obscured one in the annotation mask. This overwrites annotated pixels with the original pixels, thus reconstructing the original image. Processing continues to optional operation 710 from operation 708.

At optional operation 710, the annotated image is scaled down to the original size if necessary. While not shown in the flowchart, other change related processes may also be performed. If the annotated image was subjected to a change such as rotation, size change, and the like by an annotation-unaware application, those changes may be detected and reconstruction process adjusted to account for the changes as described previously in conjunction with FIG. 3. Processing continues to operation 712 from optional operation 710.

At operation 712, the original (reconstructed) image is displayed to the user and can be further processed. Processing advances from operation 712 to optional operation 714.

At optional operation 714, the annotations are presented to the user along with the reconstructed image such that the user can further edit the image and/or the annotations. After optional operation 714, processing moves to calling process for further actions.

The operations included in processes 600 and 700 are for illustration purposes. Providing flattening of annotations onto images white saving OIC information may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for using obscured image data to reconstruct an annotated image, the method comprising:
    receiving an image to be annotated and annotations to be superimposed onto the image;
    determining obscured image content (OIC) based on a position of the annotations to be superimposed onto the image;
    persisting OIC data separate from the image, wherein the OIC data comprises a minimal amount of information necessary to reconstruct the image, the minimal amount of information comprising pixel data from the image which has been obscured by the annotations;
    rendering the annotations on the image, wherein the annotations are persisted on the image such that the annotated image is a single layer flat image;
    making the annotated image and the OIC data available for use by annotation-aware and annotation-unaware applications;
    receiving the annotated image and the OIC data;
    generating a bitmap based on the annotated image;
    reading the OIC data;
    copying only the pixel data from the image which has been obscured by the annotations onto the image to reconstruct the obscured pixels;
    displaying the reconstructed image; and
    storing an identifier to mitigate changes by at least one of the annotation-unaware applications, wherein the identifier uniquely identifies exact binary data in the image, wherein the identifier is stored with restore data for restoring the image from the annotated image.

2. The method of claim 1, further comprising:
    generating a monochrome annotation mask based on the image;
    rendering the annotations on the annotation mask;
    generating the OIC on the annotation mask by copying pixels obscured by the annotations on the image to the annotation mask; and
    persisting the annotation mask and the OIC data.

3. The method of claim 2, further comprising:
    adjusting the annotation mask to compensate for rendering effects;
    expanding the annotation mask to reduce compression artifacts; and
    if the annotations cause an increase in image size, adjusting the image size and the annotation mask size based on the increase.

4. The method of claim 2, wherein persisting the annotation mask and the OIC data includes:
    compressing the annotation mask and the OIC data; and
    saving the compressed annotation mask and the OIC data in one of: a side channel of the image, a metadata header of the image, a separate file associated with the image, and a supplemental data store.

5. The method of claim 2, further comprising:
    initializing all pixels of the annotation mask to a default color prior to rendering the annotations on the annotation mask.

6. The method of claim 2, further comprising:
    expanding a count of pixels on the annotation mask for capturing OIC from the image.

7. The method of claim 1, wherein the image includes at least one from a set of: a still image, a video image, a text document, a spreadsheet document, and a graphic.

8. The method of claim 1, further comprising:
    scaling down the original image to its original size, if the size of the image has been increased to accommodate the annotations.

9. The method of claim 1, further comprising:
    displaying the annotations along with the reconstructed image for further editing by a user.

10. A system for using obscured image data to reconstruct an annotated image, the system comprising:
    a memory;
    a processor coupled to the memory, wherein the processor is configured to execute program modules including:
    an annotation integration module configured to:
    receive an image to be annotated and annotations to be superimposed onto the image;

determine obscured image content (OIC) based on a position of the annotations to be superimposed onto the image;

persist OIC data separate from the image, wherein the OIC data comprises a minimal amount of information necessary to reconstruct the image, the minimal amount of information comprising pixel data from the image which has been obscured by the annotations;

render the annotations on the image, wherein the annotations are persisted on the image such that the annotated image is a single layer flat image;

make the annotated image and the OIC data available for use by annotation-aware and annotation-unaware applications;

store an identifier to mitigate changes by at least one of the annotation-unaware applications, wherein the identifier uniquely identifies exact binary data in the image, wherein the identifier is stored with restore data for restoring the image from the annotated image; and a reconstruction module configured to:
  receive the annotated image and the OIC data;
  generate a bitmap based on the annotated image;
  copy only the pixel data from the image which has been obscured by the annotations onto the image based on a location of each obscured pixel to reconstruct the obscured pixels on the annotated image; and
  render the reconstructed image.

11. The system of claim 10, wherein the annotation integration module is further configured to:

generate a monochrome annotation mask based on the received image, wherein all pixels of the annotation mask are initialized to a default color;

render the received annotations on the annotation mask;

generate the OIC data on the annotation mask by copying pixels obscured by the annotations on the image to the annotation mask; and persist the annotation mask and the OIC data in one of: a side channel of the image, a metadata header of the image, a separate file associated with the image, and a supplemental data store.

12. The system of claim 10, wherein the annotation integration module is further configured to:

store at least one from a set of: a Cyclic Redundancy Check (CRC) of image data, a CRC of the OIC data, and a property associated with the image along with the OIC data.

13. The system of claim 12, wherein the property associated with the image includes at least one from a set of: a size, a width, a height, a color property, a contrast property, and a brightness property of the image.

14. The system of claim 12, wherein the construction module is further configured to:

detect a modification of the annotated image after the annotation mask and the OIC data were saved;

determine a type of modification; and adjust the OIC data before copying to the image, if the modification includes one of: a rotation, a horizontal flip, a vertical flip, and a resize with preserved aspect ratio.

15. The system of claim 14, wherein the construction module is further configured to:

perform an image analysis, if the modification is other than one of: a rotation, a horizontal flip, a vertical flip, and a resize with preserved aspect ratio;

if a predefined confidence level is reached by the image analysis, providing a user with a User Interface (UI) to adjust a placement of the annotations; and provide the user a warning that the original image is not recoverable, if the predefined confidence level is not reached by the image analysis.

16. The system of claim 10, wherein the annotation integration module and the reconstruction module are part of an Application Programming Interface (API) associated with an annotation-aware application.

17. A computer-readable storage medium comprising computer-executable instructions which, when executed by a computer, will cause the computer to perform a method of using obscured image data to reconstruct an annotated image, the method comprising:

receiving an image to be annotated and annotations to be superimposed onto the image, wherein the annotations are persisted on the image such that an annotated image comprising the image and the superimposed annotations is a single layer flat image;

generating a monochrome annotation mask based on the image, wherein the annotation mask has a same size as the image and pixels of the annotation mask are initialized to a default color;

expanding a count of pixels on the annotation mask for capturing OIC data from the image, wherein the OIC data comprises a minimal amount of information necessary to reconstruct the image, the minimal amount of information comprising pixel data from the image which has been obscured by the annotations;

rendering the annotations on the annotation mask;

adjusting the annotation mask to compensate for rendering effects;

generating obscured image content (OIC) on the annotation mask by copying color depth information associated with pixels obscured by the annotations on the image to the annotation mask;

persisting the annotation mask and the OIC data in one of: a side channel of the image, a metadata header of the image, a separate file associated with the image, and a supplemental data store;

storing at least one from a set of: a Cyclic Redundancy Check (CRC) of image data to mitigate changes by at least one annotation-unaware application, wherein the identifier uniquely identifies exact binary data in the image, wherein the identifier is stored with restore data for restoring the image from the annotated image;

generating a bitmap based on the annotated image;

reading the annotation mask and the OIC data;

detecting a modification of the annotated image after the annotation mask and the OIC data were saved;

determining a type of modification;

adjusting the OIC data, if the modification includes one of: a rotation, a horizontal flip, a vertical flip, and a resize with preserved aspect ratio;

copying only the pixel data from the image which has been obscured by the annotations onto the image to reconstruct the obscured pixels; and displaying the reconstructed image.

18. The computer-readable storage medium of claim 17, wherein the method further comprises:

displaying the annotations to enable a user to perform further edits on the annotations.

* * * * *